United States Patent
Haeuptle (10) Patent No.: US 7,257,515 B2
(45) Date of Patent: Aug. 14, 2007

(54) SLIDING WINDOW FOR ALERT GENERATION

(75) Inventor: Michael Haeuptle, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 513 days.

(21) Appl. No.: 10/792,557

(22) Filed: Mar. 3, 2004

(65) Prior Publication Data
US 2005/0197792 A1 Sep. 8, 2005

(51) Int. Cl.
*G06F 11/30* (2006.01)
*G06F 15/00* (2006.01)
*G08B 29/00* (2006.01)

(52) U.S. Cl. .................. 702/185; 702/182; 340/511

(58) Field of Classification Search ............ 702/82–84, 702/122, 113–115, 177, 179, 182–188; 340/511, 340/525, 691.1, 691.6, 7.58, 7.59; 700/12, 700/17, 83
See application file for complete search history.

(56) References Cited

U.S. PATENT DOCUMENTS

| | | | | |
|---|---|---|---|---|
| 3,312,969 A | * | 4/1967 | Halsted | 342/93 |
| 3,505,649 A | * | 4/1970 | Evans | 701/223 |
| 3,797,014 A | * | 3/1974 | Tompkins et al. | 342/90 |
| 4,517,554 A | * | 5/1985 | Moser et al. | 340/514 |
| 5,260,687 A | * | 11/1993 | Yamauchi et al. | 340/522 |
| 5,293,323 A | * | 3/1994 | Doskocil et al. | 702/185 |
| 5,609,156 A | * | 3/1997 | Keith et al. | 600/463 |
| 5,724,362 A | * | 3/1998 | Lau | 714/704 |
| 5,852,793 A | * | 12/1998 | Board et al. | 702/56 |
| 6,098,195 A | * | 8/2000 | Northcott | 714/812 |
| 6,182,022 B1 | * | 1/2001 | Mayle et al. | 702/182 |
| 6,424,930 B1 | * | 7/2002 | Wood | 702/184 |
| 6,510,509 B1 | * | 1/2003 | Chopra et al. | 712/13 |
| 6,633,834 B2 | * | 10/2003 | Conrad et al. | 702/188 |
| 6,732,063 B2 | * | 5/2004 | Famili et al. | 702/188 |

* cited by examiner

Primary Examiner—Marc S. Hoff
Assistant Examiner—Janet L Robbins (57) ABSTRACT

A method for generating alerts from a periodically sampled system is disclosed. The method includes maintaining a sampling window having a predefined number of most-recently collected samples. The method further includes calculating an alert value, the alert value representing a ratio of a first value to a total number of samples in the sampling window, the first value representing a total number of samples in the sampling window having parameters exceeding a predefined sample alert threshold. The method additionally includes generating a first alert if the alert value exceeds a predefined alert threshold.

19 Claims, 3 Drawing Sheets

SLIDING WINDOW FOR ALERT GENERATION

BACKGROUND OF THE INVENTION

Electronic monitoring is commonly employed to monitor the state of a system. From computer system performance to home security to automobile engines, electronic monitoring is increasingly employed to generate alerts if the monitored system fails to perform satisfactorily in some manner. Monitoring can be performed on a system-wide basis or on a component of the system. In the following disclosure, system monitoring is discussed although it should be understood that such discussion applies as well to monitoring an individual component since the difference is subjective. That is, a person may consider an object a system by itself, while another may consider the same object a component in a larger system.

One of the most common ways to continuously monitor a system is by periodic sampling. In periodic sampling, the state of the monitored system is sampled on a periodic schedule. In a typical monitoring situation, some predefined alert threshold is specified. If the value of the most recently obtained sample of data exceeds the predefined alert threshold, an alert is generated. If the most recently obtained sample falls below the threshold, no alert is generated.

This method of alert generation is, however, susceptible to transient conditions. For example, if the state of the monitored system swings rapidly above and below the predefined alert threshold every sampling period or every few sampling periods, alerts are alternately sent and suppressed. If the sampling period is relatively high, e.g., many times per second or per minute, the alert signal simply jitters on and off.

SUMMARY OF INVENTION

The invention relates, in an embodiment, to a method for generating alerts from a periodically sampled system. The method includes maintaining a sampling window having a predefined number of most-recently collected samples. The method further includes calculating an alert value, the alert value representing a ratio of a first value to a total number of samples in the sampling window, the first value representing a total number of samples in the sampling window having parameters exceeding a predefined sample alert threshold. The method additionally includes generating a first alert if the alert value exceeds a predefined alert threshold.

In another embodiment, the invention relates to an article of manufacture comprising a program storage medium having computer readable code embodied therein, the computer readable code being configured to generate alerts from a periodically sampled system. There is included computer readable code for maintaining a sampling window having a predefined number of most-recently collected samples. There is further included computer readable code for calculating an alert value, the alert value representing a ratio of a first value to a total number of samples in the sampling window, the first value representing a total number of samples in the sampling window having parameters exceeding a predefined sample alert threshold. Additionally, there is included computer readable code for generating a first alert if the alert value exceeds a predefined alert threshold.

In yet another embodiment, the invention relates to a method for fine-tuning an alert signal obtained from a periodically sampled system. There is included providing an alert signal generator. The alert signal generator includes first logic for maintaining a sampling window at a constant window size, the sampling window containing most-recently collected samples. The alert signal generator includes second logic for calculating an alert value, the alert value representing a ratio of a first value to a total number of samples in the sampling window, the first value representing a total number of samples in the sampling window having parameters exceeding a sample alert threshold. The alert generator includes third logic for generating a first alert if the alert value exceeds an alert threshold. There is also included providing a control panel having a plurality of user-manipulable controls. The plurality of user-manipulable controls include at least one of a first control for varying the window size, a second control for varying the sample alert threshold, and a third control for varying the alert threshold.

These and other features of the present invention will be described in more detail below in the detailed description of various embodiments the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF VARIOUS EMBODIMENTS

The present invention will now be described in detail with reference to various embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention may also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general purpose computer and/or a dedicated computing device when appropriately programmed and may include a combination of a computer/computing device and dedicated/programmable circuits adapted for the various tasks pertaining to embodiments of the invention.

In accordance with embodiments of the present invention, there is provided a technique for substantially eliminating alert jitters due to transient conditions in the periodically sampled monitored system. Embodiments of the invention provide a persistent sliding window having a predefined number of most-recently collected samples. The predefined number of most-recently collected samples may be predefined by the system or may be definable by the user.

As a sample is collected, this most-recently collected sample is added to the sliding window, and the oldest sample in the sliding window is discarded. Thus, the size of the sliding window remains constant despite the fact that its membership changes as the samples are collected.

Periodically or upon the collection of a new sample, an alert value is calculated. This alert value calculation may be explained using an example. Suppose there are ten samples in the sliding window. As new samples are collected, they are added to the sliding window and the oldest samples are discarded, thereby keeping the sliding window membership at 10.

Suppose each sample contains a parameter having a value between 0 and 1, with 0.5 representing the predefined sample alert threshold (SAT). The predefined sample alert threshold (SAT) represents a system-defined or user-definable value that is employed to ascertain whether a sample collected reflects an event that potentially raises an alert or is simply a normal state of operation. In the case where the predefined SAT is 0.5, if a sample parameter is greater than 0.5, that sample is deemed a potential alert-causing sample (PACS). The borderline case wherein the sampled parameter is equal to the SAT (e.g., 0.5 in the current example), the sample may be deemed a PACS or a non-PACS, depending on how the alert generating algorithm is configured.

The calculated alert value (CAV) represents the ratio of PACS to the total number of samples in the sliding window. If there are four samples whose parameters exceed the predefined SAT value of 0.5, the number of PACS will be 4. In this case, the calculated alert value will be 4 divided by 10 or 40%.

Furthermore, there is provided a predefined alert threshold (AT), which may be a system-defined or a user-definable value. If the calculated alert value (CAV) exceeds the predefined alert threshold (AT), an alert is generated. On the other hand, if the CAV is below the predefined alert threshold (AT), the alert is not generated. In the borderline case wherein the CAV equals the predefined alert threshold (AT), an alert may be generated or may be suppressed depending on how the alert generating algorithm is configured.

Since the alert is generated based on the calculated alert value associated with the sliding window instead of being based solely on the value of the most recently collected sample, jitters in the alert signal are substantially eliminated. Further, the user may be furnished with controls in some embodiments to tune the alerting system to generate alerts based on user-specified thresholds. These controls may be furnished on a computer screen as part of a control panel to allow the user to fine-tune the alert signal, for example. As an example, if jitter is deemed excessive in the alert signal received, the user may increase the number of samples in the sliding window, thereby lessening the impact of transients. As another example, if additional sensitivity is desired, the user may decrease the number of samples in the sliding window and/or lowering the sample alert threshold (SAT) and/or lowering the predefined alert threshold (AT). One skilled in the art would readily appreciate that providing these user controls to allow the user to fine-tune the sliding window-based alert signal represents a level of refinement not available in the prior art.

Figure 1:
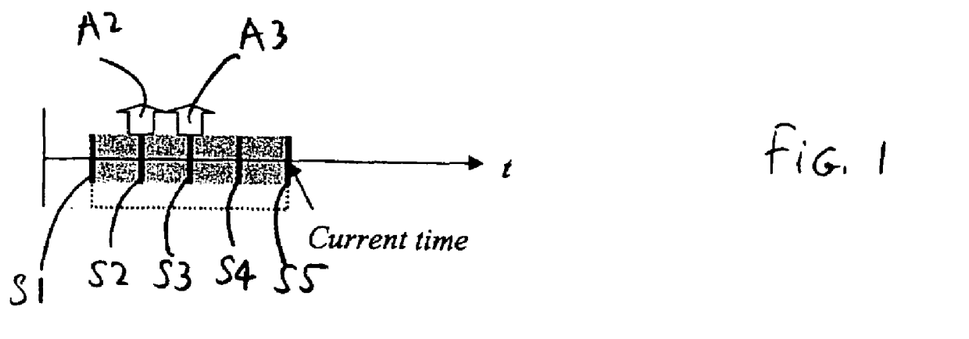
FIG. 1 illustrates, in accordance with an embodiment of the invention, a sliding window having a plurality of samples.

The features and advantages of the present invention may be better understood with reference to the figures and drawings below. Suppose an internet merchant wishes to be alerted if the time it takes to serve up a webpage from his internet merchandising server is greater than 10 seconds. In FIG. 1, each vertical line represents a sample of data collected every 5 minutes from a data probe that simulates the loading of the webpage of interest. Five initial samples (S1, S2, S3, S4, and S5) are shown. The sliding window is shown to be 20 minutes, spanning five samples S1–S5.

In FIG. 1, the samples having parameters exceeding the predefined sample alert threshold (SAT) are shown with large arrows. In this example, for samples S2 and S3, the time taken to serve up the webpage of interest is greater than the sample alert threshold value of 10 seconds. Accordingly, arrows A2 and A3 are shown above samples S2 and S3.

In this case, the calculated alert value (CAV) is $\frac{2}{5}$ or 40% since two out of the five samples in the sliding window exceed the predefined sample alert threshold (SAT). If the predefined alert threshold is 50%, i.e., the CAV needs to be 50% or higher to generate an alert, no alert would be generated in the case of FIG. 1.

Figure 2:
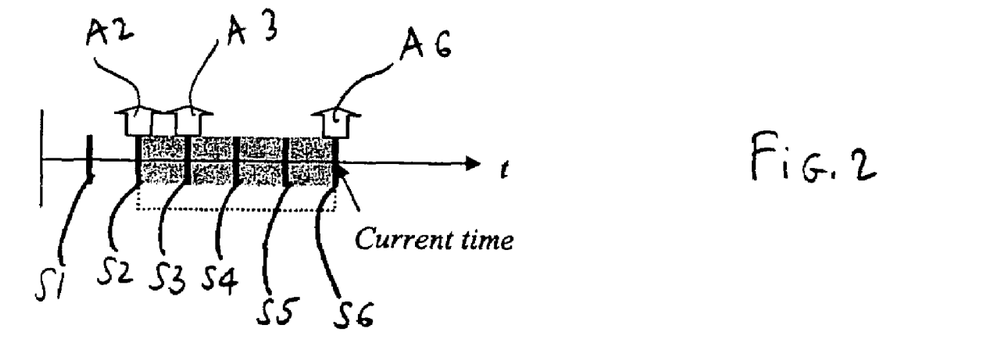
FIG. 2 illustrates, in accordance with an embodiment of the present invention, the window of FIG. 1 after another sample is obtained.

In FIG. 2, another sample S6 is collected. Sample S1 is dropped from the sliding window to keep the size of the sliding window constant. In this case, sample S6 happens to exceed the predefined sample alert threshold (SAT) and is thus shown with a large white arrow A6 in FIG. 2. The calculated alert value (CAV) is 60% since 3 out of the 5 samples in the sliding window exceed the predefined sample alert threshold (SAT). Furthermore, since the CAV exceeds the predefined alert threshold (AT) of 50%, an alert is generated. The alert is furnished to the user to indicate a change from the non-alert state of FIG. 1 to the alert state of FIG. 2.

Figure 3:
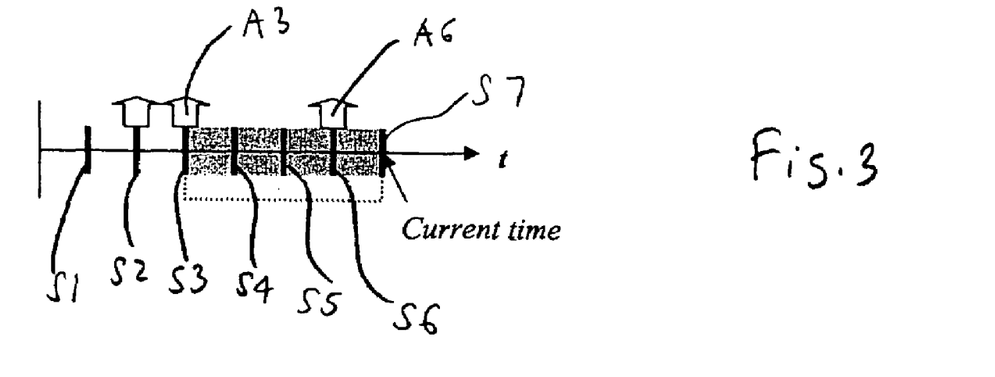
FIG. 3 illustrates, in accordance with an embodiment of the present invention, the window of FIG. 2 after another sample is obtained.

In FIG. 3, another sample S7 is collected. Sample S2 is dropped from the sliding window to keep the size of the sliding window constant. In this case, sample S7 happens to be below the predefined sample alert threshold (SAT). The calculated alert value (CAV) is 40% since only 2 out of the 5 samples in the sliding window exceed the predefined sample alert threshold (SAT). Furthermore, since the CAV does not exceed the predefined alert threshold (AT) of 50%, no alert is generated.

In an embodiment, a notification may be generated if the monitored system moves from an alert state (such as in FIG.

2) to a non-alert state (such as in FIG. 3). The notification may be generated in this case to let the user know that the alert state no longer exists, for example. In some systems, the user may be given a choice to set a preference setting indicating whether such a notification is desired when the system moves from an alert state in one sampling period to a non-alert state in the immediately succeeding sampling period.

Figure 4:
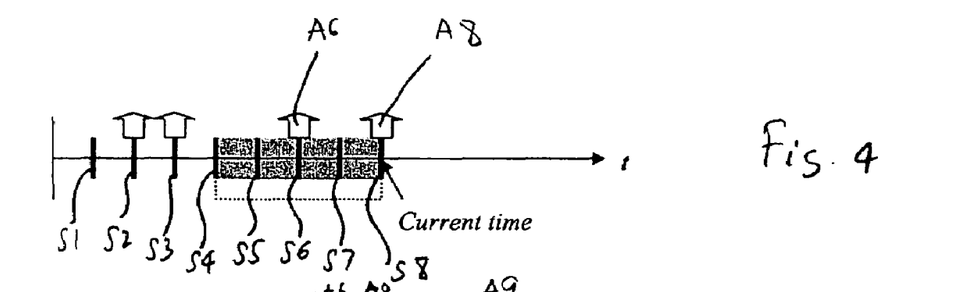
FIG. 4 illustrates, in accordance with an embodiment of the present invention, the window of FIG. 3 after another sample is obtained.

In FIG. 4, another sample S8 is collected. Sample S3 is dropped from the sliding window to keep the size of the sliding window constant. In this case, sample S8 happens to exceed the predefined sample alert threshold (SAT) and is thus shown with a large white arrow A8 in FIG. 4. The calculated alert value (CAV) is 40% since only 2 out of the 5 samples in the sliding window exceed the predefined sample alert threshold (SAT). Furthermore, since the CAV does not exceed the predefined alert threshold (AT) of 50%, no alert is generated.

Figure 5:
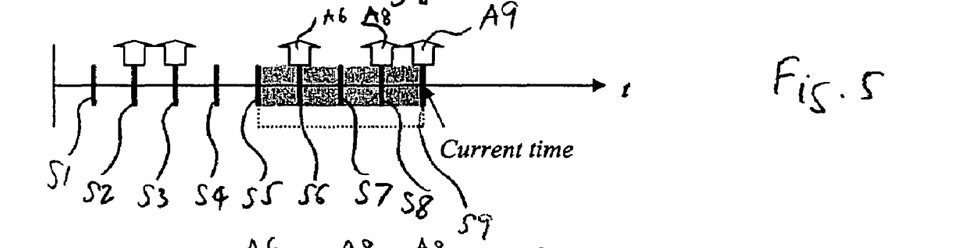
FIG. 5 illustrates, in accordance with an embodiment of the present invention, the window of FIG. 4 after another sample is obtained.

In FIG. 5, another sample S9 is collected. Sample S4 is dropped from the sliding window to keep the size of the sliding window constant. In this case, sample S9 happens to exceed the predefined sample alert threshold (SAT) and is thus shown with a large white arrow A9 in FIG. 5. The calculated alert value (CAV) is 60% since 3 out of the 5 samples in the sliding window exceed the predefined sample alert threshold (SAT). Furthermore, since the CAV exceeds the predefined alert threshold (AT) of 50%, an alert is generated. The alert is furnished to the user to indicate a change from the non-alert state of FIG. 4 to the alert state of FIG. 5.

Figure 6:
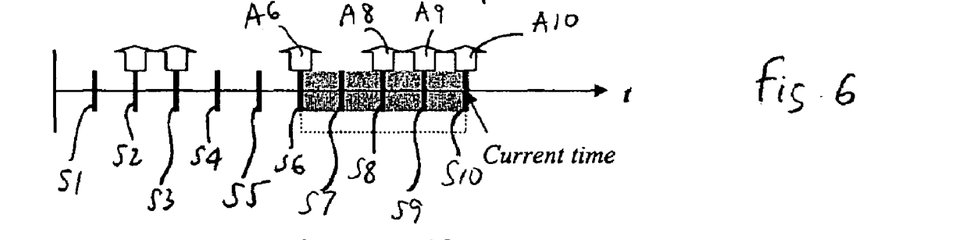
FIG. 6 illustrates, in accordance with an embodiment of the present invention, the window of FIG. 5 after another sample is obtained.

In FIG. 6, another sample S10 is collected. Sample S5 is dropped from the sliding window to keep the size of the sliding window constant. In this case, sample S10 happens to exceed the predefined sample alert threshold (SAT) and is thus shown with a large white arrow A10 in FIG. 6. The calculated alert value (CAV) is 80% since 4 out of the 5 samples in the sliding window exceed the predefined sample alert threshold (SAT). Furthermore, since the CAV exceeds the predefined alert threshold (AT) of 50%, an alert is generated.

In an embodiment, a new alert is furnished to the user when moving from the alert state of FIG. 5 to the alert state of FIG. 6. In another embodiment, the new alert is generated but not furnished to the user if the user chooses not to be bothered with a new alert if the state did not change (i.e., simply moving from one alert state to another alert state). In an embodiment, however, the user may be alerted if a different alert message is generated. For example, a sample may exceed the predefined sample alert threshold (SAT) and may be classified as one of several categories of severity (e.g., warning, minor, major, critical). The user may elect, via a preference setting, to be notified not only with an alert but also with the highest severity level experienced by any of the samples in the sliding window. In this case, if the highest severity level changes when moving from one sampling period to the next, the user may elect to be notified of such change, and the alert system would appropriately notify the user when such change occurs.

Figure 7:
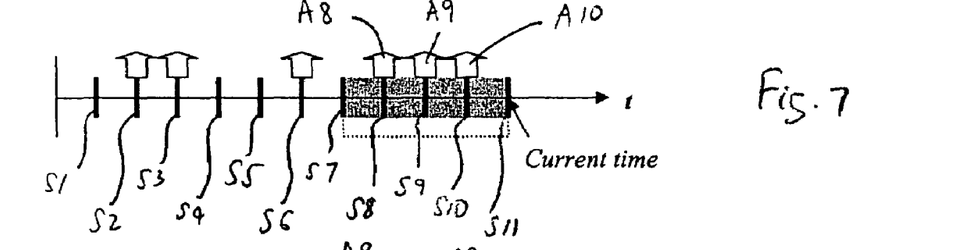
FIG. 7 illustrates, in accordance with an embodiment of the present invention, the window of FIG. 6 after another sample is obtained.

In FIG. 7, another sample S11 is collected. Sample S6 is dropped from the sliding window to keep the size of the sliding window constant. In this case, sample S11 happens to be below the predefined sample alert threshold (SAT) and is thus not shown with a large white arrow in FIG. 7. The calculated alert value (CAV) is 60% since 3 out of the 5 samples in the sliding window exceed the predefined sample alert threshold (SAT). Furthermore, since the CAV exceeds the predefined alert threshold (AT) of 50%, an alert is generated.

Figure 8:
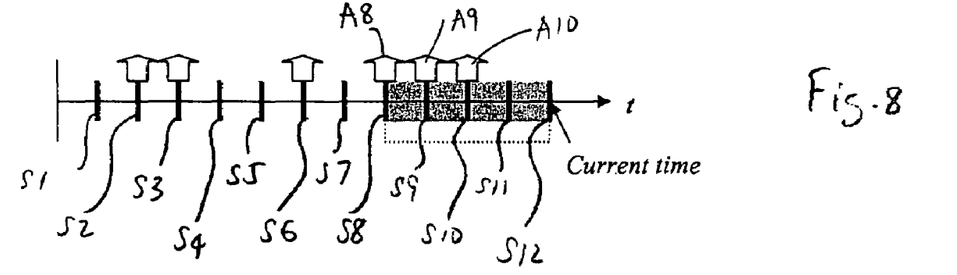
FIG. 8 illustrates, in accordance with an embodiment of the present invention, the window of FIG. 7 after another sample is obtained.

In FIG. 8, another sample S12 is collected. Sample S7 is dropped from the sliding window to keep the size of the sliding window constant. In this case, sample S12 happens to be below the predefined sample alert threshold (SAT) and is thus not shown with a large white arrow in FIG. 8. The calculated alert value (CAV) is 60% since 3 out of the 5 samples in the sliding window exceed the predefined sample alert threshold (SAT). Furthermore, since the CAV exceeds the predefined alert threshold (AT) of 50%, an alert is generated.

In an embodiment, the calculated alert value is not computed until the sliding window is filled up. In the context of the current example, no calculation would be done until at least five samples are collected. In another embodiment, calculation is performed with the uncollected samples counted as "non-alert" samples. Thus, if only three samples are collected and all exceed the predefined sample alert threshold (SAT), an alert would be generated since the predefined alert threshold (AT) of 50% would have been exceeded irrespective whether the last two samples of the sliding window, which are yet to be collected at that point, turn out to be "non-alert" samples or "alert" samples.

Figure 9:
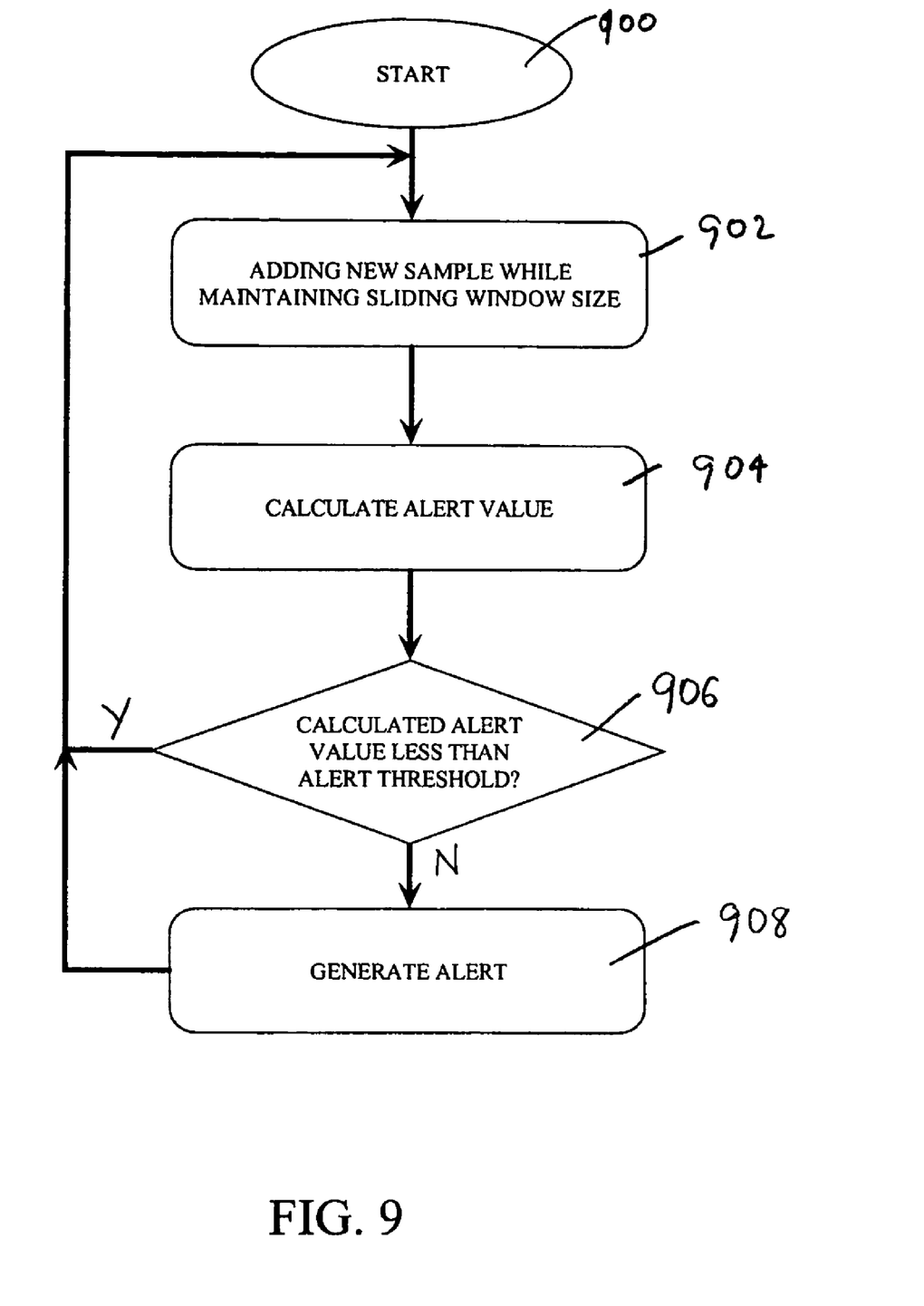
FIG. 9 shows, in accordance with an embodiment of the invention, the sliding window technique for generating alerts.

FIG. 9 shows, in accordance with an embodiment of the invention, the sliding window technique for generating alerts. In step 902, the size of the sliding window is maintained as new samples are added. As mentioned, the size of the sliding window may be maintained in an embodiment by adding the most recently collected sample to the sliding window and by discarding the oldest sample in the sliding window. In step 904, the alert value is calculated by, in an embodiment, dividing the number of samples having parameters exceeding the predefined sample alert threshold (SAT) by the number of samples in the sliding window.

In step 906, the calculated alert value (CAV) is compared against a predefined alert threshold (AT). If the calculated alert value (CAV) exceeds the predefined alert threshold (AT), an alert is generated (step 908). The method returns from step 908 to step 902 wherein the sliding window membership is changed when a new sample is collected. On the other hand, if the calculated alert value (CAV) is below the predefined alert threshold (AT), the method returns from step 906 to step 902 wherein the sliding window membership is changed when a new sample is collected.

In an embodiment, the sliding window alarming technique is employed as a part of an Internet Service monitoring system, such as the OpenView Internet Services™ or OVIS™ product from the Hewlett-Packard Company of Palo Alto, Calif. The sample may be obtained by periodically sending a synthetic transaction from probes to a target. The probe may create a HTTP request, which is then sent to the HTTP server. The manner in which the server responds to the probe's request may be used to calculate a variety of metrics, such as server availability and server response time.

Table 1 shows, in an embodiment of the present invention, the various probes that may be employed in such an Internet service monitoring system.

TABLE 1

DHCP (Dynamic Host Configuration Protocol)
DIAL (Dial-Up Networking Service)
DNS (Domain Name System)
Exchange (MAPI)
FTP (File Transfer Protocol)

TABLE 1-continued

HTTP (Hypertext Transfer Protocol)
HTTPS (Hypertext Transfer Protocol Secure)
HTTP_TRANS (Web Transaction Recorder)
ICMP (Internet Control Message Protocol-Ping)
IMAP4 (Internet Message Access Protocol)
LDAP (Lightweight Directory Access Protocol)
MAILROUNDTRIP (Mail Round Trip)
NNTP (Network News Transfer Protocol)
NTP (Network Time Protocol)
ODBC (Open Database Connectivity)
POP3 (Post Office Protocol 3)
RADIUS (Remote Authentication Dial In User Service)
SAP Basis
Script (generic script)
SMS (Short Message Service)
SMTP (Simple Mail Transfer Protocol)
SOAP (Simple Object Access Protocol)
STREAM_MEDIA (Streaming Media)
TCP (Transmission Control Protocol)
WAP (Wireless Application Protocol)

Table 2 shows, in an embodiment of the present invention, the various metrics that may be measured from the server's response to the request sent via the probe.

TABLE 2

ANSWER_DNS
AUTH_TIME
AVAILABILITY
BAUD_RATE
BROKEN_LINKS
BWDLOSS
CONGESTION
CONNECT_TIME
CUSTOMER_NAME
DATA_TRANS_BYTES
DNS_SETUP_TIME
FAILED_TRANSACTION_RATE
FWDLOSS
GROUP_TIME
HTTP_STATUS
HTTP_TIME
LATENCY
LEASE_TIME
MAX_RESPONSE
MIN_RESPONSE
NUM_ENTRIES
OFFER_TIME
PACKETS_RECEIVED
PACKET_LOSS
PORT_TIME
RAS_CONNECT_STATUS
READ_TIME
REQUESTS
RESPONSE_TIME
RESPONSE_TIME_VIOLATION_COUNT
RESPONSE_TIME_VIOLATION_PERCENTAGE
SEND_TIME
SERVER_RESPONSE_TIME
SERVER_RESP_TIME
SERVICE_NAME
SETUP_TIME
STREAM_SETUP_TIME
TEAR_DOWN_TIME
TERMINATION_STATUS
TOTAL_CONNECTION_TIME
TRANSACTION_RATE
TRANSACTION_SIZE
TRANSACT_AVG
TRANSFER_BYTES
TRANSFER_TIME
TRANSFER_TPUT
TRANS_BYTES

Table 3 shows, in an implementation of the present invention, various probe types and associated metrics that may be collected along with their descriptions.

TABLE 3

| Probe type | Metrics (in italic; Metric 1–8 are labels) and Description |
|---|---|
| DHCP | *AVAILABILITY* - If a measurement could not be retrieved a 0 is set otherwise availability is set to 1<br>*RESPONSE_TIME* - Total response time for the DHCP service (Setup Time + Transfer Time)<br>*SETUP_TIME* - Time to resolve address and establish the connection if host is specified<br>*TRANSFER_TPUT* - Transfer bytes/Transfer Time in kbytes/sec<br>*OFFER_TIME* - Metric 1 - Time to first offer from server<br>*LEASE_TIME* - Metric 2 - Time to lease offered IP address<br>*TRANSFER_TIME* - Metric 5 - Time to complete entire transaction (discover, offer, request, acknowledge and release)<br>*TRANS_BYTES* - Metric 6 - The number of bytes transferred |
| DIAL | *AVAILABILITY* - If a measurement could not be retrieved a 0 is set otherwise availability is set to 1<br>*RESPONSE_TIME* - Time taken to establish PPP connection<br>*RAS_CONNECT_STATUS* - Metric 1 - Error returned by RAS Dial Will be 0 for successful connection<br>*BAUD_RATE* - Metric 2 - Baud Rate - Transfer rate as reported by the modem<br>*TOTAL_CONNECTION_TIME* - Metric 3 - Total time connected<br>*TERMINATION_STATUS* - Metric 4 - True (1) for abnormal termination of connection, otherwise false (0) |
| DNS | *AVAILABILITY* - If a measurement could not be retrieved a 0 is set otherwise availability is set to 1<br>*RESPONSE_TIME* - Execution time of the query to a hostname/IP address<br>*ANSWER_DNS* - Metric 1 - Answer DNS is set to 0 if the hostname cannot be resolved, and 1 if it can In either case Availability will be 1 (or true) because the server is doing |
| Exchange | *AVAILABILITY* - If a measurement could not be retrieved a 0 is set, otherwise availability is set to 1<br>*SETUP_TIME* - Time to log in to the Exchange Server and resolve the name<br>*RESPONSE_TIME* - Total response time of the Exchange service Setup Time + time to read all messages and mark the OVIS ones for delete |
| FTP | *AVAILABILITY* - If a measurement could not be retrieved a 0 is set, otherwise availability is set to 1<br>*RESPONSE_TIME* - Total response time of the FTP request (DNS Setup Time + Connect Time + Server Response Time + Authentication Time + Port Time + Transfer Time)<br>*SETUP_TIME* - Time to resolve address and establish the connection<br>*TRANSFER_TPUT* - Transfer bytes/Transfer Time in kbytes/sec<br>*DNS_SETUP_TIME* - Metric 1 - Time to resolve hostname through DNS |

TABLE 3-continued

| Probe type | Metrics (in italic; Metric 1–8 are labels) and Description |
|---|---|
| | CONNECT_TIME - Metric 2 - Time to perform connect to FTP server |
| | SERVER_RESP_TIME - Metric 3 - Time it takes to receive the FTP start header (220) |
| | AUTH_TIME - Metric 4 - Time to authenticate user (time to send username/password and receive response) |
| | PORT_TIME - Metric 5 - Time to send the client connection ports to the FTP server |
| | TRANSFER_TIME - Metric 6 - Overall time to receive data on the data connection |
| | DATA_TRANS_BYTES - Metric 7 - The number of bytes transferred |
| HTTP/HTTPS | AVAILABILITY - If a measurement could not be retrieved a 0 is set, otherwise availability is set to 1 |
| | RESPONSE_TIME - Total response time for the web page (or secure web page) access (DNS Setup Time + Connect Time + Server Response Time + Transfer Time) |
| | SETUP_TIME - Time to resolve address and establish the connection |
| | TRANSFER_TPUT - Transfer bytes/Transfer Time in kbytes/sec |
| | DNS_SETUP_TIME - Metric 1 - Time to resolve hostname through DNS |
| | CONNECT_TIME - Metric 2 - Time to connect to HTTP/S server or proxy |
| | SERVER_RESP_TIME - Metric 3 - Time it takes to send HTTP/S Get request and receive first response packet |
| | TRANSFER_TIME - Metric 4 - Time it took to send request and receive all reply packets |
| | TRANS_BYTES - Metric 5 - The number of bytes transferred |
| | HTTP_STATUS - Metric 6 - HTTP/S status code |
| | REQUESTS - Metric 7 - Number of HTTP/S requests For example, if the page was redirected or embedded objects are downloaded |
| | BROKEN_LINKS - Metric 8 - Number of embedded objects that couldn't be downloaded (eg, URL not found) |
| HTTP_TRANS | URL/Navigation Point Mode |
| | AVAILABILITY - If a measurement could not be retrieved a 0 is set, otherwise availability is set to 1 |
| | RESPONSE_TIME - |
| | Step: Total response time for the web page access (DNS Setup Time + Connect Time + Server Response Time + Transfer Time) |
| | Transaction: Total response time for all steps |
| | SETUP_TIME - |
| | Step: Time to resolve address and establish the connection |
| | Transaction: Total setup time for all steps |
| | TRANSFER_TPUT - |
| | Step: Transfer bytes/Transfer Time in kbytes/sec |
| | Transaction: Total transfer throughput for the transaction |
| | DNS_SETUP_TIME - Metric 1 - |
| | Step: Time to resolve hostname through DNS |
| | Transaction: Total DNS setup time for all steps |
| | CONNECT_TIME - Metric 2 - |
| | Step: Time to connect to HTTP/S server or proxy |
| | Transaction: Total connect time for all steps |
| | SERVER_RESP_TIME - Metric 3 - |
| | Step: Time it takes to send HTTP Get request and receive first response packet |

TABLE 3-continued

| Probe type | Metrics (in italic; Metric 1–8 are labels) and Description |
|---|---|
| | Transaction: Total server response time for all steps |
| | TRANSFER_TIME - Metric 4 - |
| | Step: Time it took to send request and receive all reply packets |
| | Transaction: Total transfer time for all steps |
| | TRANSFER_BYTES - Metric 5 - |
| | Step: The number of bytes transferred |
| | Transaction: Total transfer bytes for all steps |
| | HTTP_STATUS - Metric 6 - |
| | Step: HTTP status code |
| | Transaction: HTTP status code of the last step |
| | REQUESTS - Metric 7 - |
| | Step: Number of HTTP requests For example, if the page was redirected or embedded objects are downloaded |
| | Transaction: Total requests for all steps |
| | BROKEN_LINKS - Metric 8 - |
| | Step: Number of embedded objects that couldn't be downloaded (eg, URL not found) |
| | Transaction: Total broken links for all steps |
| ICMP | AVAILABILITY - If a measurement could not be retrieved a 0 is set, otherwise availability is set to 1 |
| | RESPONSE_TIME - Response time is the average roundtrip time for all ICMP packets |
| | TRANSFER_TPUT - Transfer bytes/Transfer Time in kbytes/sec |
| | MIN_RESPONSE - Metric 1 - Minimum roundtrip time of all ICMP packets |
| | MAX_RESPONSE - Metric 2 - Maximum roundtrip time of all ICMP packets |
| | PACKET_LOSS - Metric 3 - Number of packets lost |
| IMAP4 | AVAILABILITY - If a measurement could not be retrieved a 0 is set, otherwise availability is set to 1 |
| | RESPONSE_TIME - Total response time for the IMAP4 service (Setup Time + Connection Time + Server Response Time + Authentication Time + Transfer Time) |
| | SETUP_TIME - Time to resolve address and establish the connection |
| | TRANSFER_TPUT - Transfer bytes/Transfer Time in kbytes/sec |
| | DNS_SETUP_TIME - Metric 1 - Time to resolve hostname through DNS |
| | CONNECT_TIME - Metric 2 - Time to connect to IMAP server |
| | SERVER_RESP_TIME - Metric 3 - Time for IMAP server to respond |
| | AUTH_TIME - Metric 4 - Time to authenticate user (time to send username/password and receive response) |
| | TRANSFER_TIME - Metric 5 - Overall time it took for the data transfer only |
| | DATA_TRANS_BYTES - Metric 6 - The number of bytes transferred |
| LDAP | AVAILABILITY - If a measurement could not be retrieved a 0 is set, otherwise availability is set to 1 |
| | RESPONSE_TIME - Total response time for the LDAP service (Setup Time + Data Transfer Time) |
| | TRANSFER_TPUT - Transfer bytes/Transfer Time in kbytes/sec |
| | DNS_SETUP_TIME - Metric 1 - Time to resolve hostname through DNS |
| | NUM_ENTRIES - Metric 2 - Number of returned entries |

TABLE 3-continued

| Probe type | Metrics (in italic; Metric 1–8 are labels) and Description |
|---|---|
| | *CONNECT_TIME* - Metric 3 - Time to connect to LDAP server |
| | *TRANSFER_TIME* - Metric 4 - Overall time it took for the data transfer only |
| | *TRANS_BYTES* - Metric 5 - The number of bytes transferred |
| MAILROUNDTRIP | *AVAILABILITY* - If a measurement could not be retrieved a 0 is logged, otherwise availability is set to 1 |
| | *SETUP_TIME* - Time to resolve address and establish the connection |
| | *RESPONSE_TIME* - Total response time for the SMTP mail send + the POP/IMAP receive |
| | *TRANSFER_TPUT* - Transfer bytes/Transfer Time in kbytes/sec |
| NNTP | *AVAILABILITY* - If a measurement could not be retrieved a 0 is set, otherwise availability is set to 1 |
| | *RESPONSE_TIME* - Total response time for NNTP (DNS Setup Time + Connect Time + Server Response Time + Authentication Time + Group Time + Read Time + Tear Down Time) |
| | *SETUP_TIME* - Time to resolve address and establish the connection |
| | *TRANSFER_TPUT* - Transfer bytes/Transfer Time in kbytes/sec |
| | *DNS_SETUP_TIME* - Metric 1 - Time to resolve hostname through DNS |
| | *CONNECT_TIME* - Metric 2 - Time to connect to NNTP server |
| | *SERVER_RESP_TIME* - Metric 3 - Overall time to read the file (receive data on the data connection) |
| | *AUTH_TIME* - Metric 4 - Time to authenticate user (time to send username/password and receive response) |
| | *GROUP_TIME* - Metric 5 - Time to select newsgroup and get request overview of last 100 articles |
| | *READ_TIME* - Metric 6 - Time to read articles with the overall size of 10000 bytes |
| | *TEAR_DOWN_TIME* - Metric 7 - Overall time to send the QUIT request and receive the response |
| | *DATA_TRANS_TIME* - Metric 8 - The number of bytes transferred |
| NTP | *AVAILABILITY* - If a measurement could not be retrieved a 0 is set, otherwise availability is set to 1 |
| | *RESPONSE_TIME* - Total response time for the NTP service (Setup Time + Transfer Time) |
| | *SETUP_TIME* - Time to resolve address and establish the connection |
| | *TRANSFER_TPUT* - Transfer bytes/Transfer Time in kbytes/sec |
| | *DATA_TRANS_BYTES* - Metric 5 - The number of bytes transferred |
| | *TRANSFER_TIME* - Metric 6 - Overall time it took for the data transfer only |
| ODBC | *AVAILABILITY* - If a measurement could not be retrieved a 0 is set, otherwise availability is set to 1 |
| | *RESPONSE_TIME* - Total response time for the ODBC service |
| | *SETUP_TIME* - Time to setup database connection handles |
| | *TRANSFER_TPUT* - Transfer bytes/Transfer Time in kbytes/sec |
| | *CONNECT_TIME* - Metric 1 - Time to connect to database |
| | *SERVER_RESP_TIME* - Metric 2 - Time to respond to the SQL statement |
| | *TRANSFER_TIME* - Metric 3 - Overall time it took for the data transfer |
| | *DATA_TRANS_BYTES* - Metric 4 - The number of bytes transferred |
| OVTA Application (COMAPP, JMSAPP, RMIAPP SOAPAPP, WEBAPP) | *AVAILABILITY* - WEBAPP service type only The ratio of availability probe requests that failed, to the total attempts during the last interval |
| | *RESPONSE_TIME* - The average response time of the successfully completed transactions during the interval |
| | *TRANSACTION_RATE* - Metric 1 - Total number of completed transactions per second over the last interval |
| | *RESPONSE_TIME_VIOLATION_COUNT* - Metric 2 - Number of successfully completed transactions in the last interval whose measured response time exceeded the response time threshold configured in OVTA |
| | *RESPONSE_TIME_VIOLATION_PERCENTAGE* - Metric 3 - Percent of successfully completed transactions in the last interval whose measured response time exceeded the response time threshold configured in OVTA |
| | *TRANSACTION_SIZE* - Metric 4 - WEBAPP service type only The average size of the successfully completed transactions The size varies depending on the type of application and the type of transaction For transactions measured in the browser using an OVTA Browser Client Monitor, the size of these transactions is the size of the downloaded page plus all embedded content and images For transactions measured at the Web or Application server using an OVTA Web Server Monitor, the size of these transactions is the size of the downloaded page as reported in the Content-Length HTTP header This is the size of the page itself and does not include embedded images Moreover, some web-based applications will not set the Content-Length field; therefore, this metric will be 0 for transactions in these types of applications |
| | *FAILED_TRANSACTION_RATE* - Metric 5 - Total number of failed transactions per second over the last interval |
| POP3 | *AVAILABILITY* - If a measurement could not be retrieved a 0 is set, otherwise availability is set to 1 |
| | *RESPONSE_TIME* - Total response time for the POP3 Mail delivery (DNS Setup Time + Connect Time + Server Response Time + Authentication Time + Data Transfer Time) |
| | *SETUP_TIME* - Time to resolve address and establish the connection |
| | *TRANSFER_TPUT* - Transfer bytes/Transfer Time in kbytes/sec |
| | *DNS_SETUP_TIME* - Metric 1 - Time to resolve hostname through DNS |
| | *CONNECT_TIME* - Metric 2 - Time to connect to POP3 server |
| | *SERVER_RESP_TIME* - Metric 3 - Time it takes to receive the POP3 start header (+OK) |
| | *AUTH_TIME* - Metric 4 - Time to authenticate user (time to send username/password and receive response) |

TABLE 3-continued

| Probe type | Metrics (in italic; Metric 1–8 are labels) and Description |
|---|---|
| | *TRANSFER_TIME* - Metric 5 - Overall time to read all messages in the mailbox and delete the IOPS test messages |
| | *DATA_TRANS_BYTES* - Metric 6 - The number of bytes transferred |
| RADIUS | *AVAILABILITY* - If a measurement could not be retrieved a 0 is set, otherwise availability is set to 1 If the server is successfully contacted but returns an Access-Reject packet (because of a bad password, secret, etc) the Availability will be 0 |
| | *RESPONSE_TIME* - Total response time for the RADIUS service (DNS Setup Time + Data Transfer Time) |
| | *SETUP_TIME* - Time to resolve address and make connection |
| | *TRANSFER_TPUT* - Transfer bytes/Transfer Time in kbytes/sec |
| | *TRANSFER_TIME* - Metric 4 - Overall time it took for the data transfer only |
| | *DATA_TRANS_BYTES* - Metric 5 - The number of bytes transferred |
| SAP | *AVAILABILITY* - If a measurement could not be retrieved a 0 is set, otherwise availability is set to 1 Availability requires both a successful connection and a successful RFC call |
| | *RESPONSE_TIME* - Total response time for the SAP service Setup Time + Completion which is the time to complete a successful RFC call (including logon check and logout) |
| | *SETUP_TIME* - Time to get a successful connection with the RFC server |
| Script | *AVAILABILITY* - If a measurement could not be retrieved a 0 is set, otherwise availability is set to 1 |
| | *RESPONSE_TIME* - Total time running the script Or the total response time imported from the Result File script |
| SMS | *AVAILABILITY* - If a measurement could not be retrieved a 0 is set, otherwise availability is set to 1 |
| | *RESPONSE_TIME* - Total response time for the SMS service |
| SMTP | *AVAILABILITY* - If a measurement could not be retrieved a 0 is set, otherwise availability is set to 1 |
| | *RESPONSE_TIME* - Total response time for the SMTP mail request (DNS Setup Time + Connect Time + Server Response Time + Transfer Time + Tear Down Time) |
| | *SETUP_TIME* - Time to resolve address and establish the connection |
| | *TRANSFER_TPUT* - Transfer bytes/Transfer Time in kbytes/sec |
| | *DNS_SETUP_TIME* - Metric 1 - Time to resolve hostname through DNS |
| | *CONNECT_TIME* - Metric 2 - Time to connect to SMTP server |
| | *SERVER_RESP_TIME* - Metric 3 - Time it takes to receive the SMTP start header (220) |
| | *TRANSFER_TIME* - Metric 4 - Overall time to transfer the mail request (including SMTP responses to the requests such as MAIL FROM:, RCPT TO:, DATA, QUIT |
| | *TRANS_BYTES* - Metric 5 - The number of bytes transferred |
| | *TEAR_DOWN_TIME* - Metric 6 - Overall time to send the QUIT request and receive the response |
| SOAP | *AVAILABILITY* - If a measurement could not be retrieved a 0 is set, otherwise availability is set to 1 |
| | *RESPONSE_TIME* - Total response time for the web page access (DNS Setup Time + Connect Time + Server Response Time + Transfer Time) |
| | *SETUP_TIME* - Time to resolve address and establish the connection |
| | *TRANSFER_TPUT* - Transfer bytes/Transfer Time in kbytes/sec |
| | *DNS_SETUP_TIME* - Metric 1 - Time to resolve hostname through DNS |
| | *CONNECT_TIME* - Metric 2 - Time to connect to SOAP server or proxy |
| | *SERVER_RESP_TIME* - Metric 3 - Time it takes to send HTTP Get request and receive first response packet |
| | *TRANSFER_TIME* - Metric 4 - Time it took to send request and receive all reply packets |
| | *TRANS_BYTES* - Metric 5 - The number of bytes transferred |
| | *HTTP_STATUS* - Metric 6 - HTTP/S status code |
| | *REQUESTS* - Metric 7 - Number of HTTP requests For example, if the page was redirected or embedded objects are downloaded |
| | *BROKEN_LINKS* - Metric 8 - Number of embedded objects that couldn't be downloaded (eg, URL not found) |
| STREAM_MEDIA | *AVAILABILITY* - If a measurement could not be retrieved a 0 is set, otherwise availability is set to 1 |
| | *RESPONSE_TIME* - Total response time for the Streaming Media service (Setup Time + Connect Time + Server Response Time + Transfer Time) |
| | *SETUP_TIME* - Time to resolve address |
| | *TRANSFER_TPUT* -The average bandwidth used in data transfer in Kbytes/sec |
| | *CONNECT_TIME* - Metric 1 - The time to connect to the server If a proxy is used then this is the time it takes to connect to the proxy |
| | *SERVER_RESP_TIME* - Metric 2 - The time it takes for the server to start sending packets This includes the set up time for the various protocols |
| | *TRANSFER_TIME* - Metric 3 - The time it takes to transfer the data |
| | *PACKETS_RECEIVED* - Metric 4 - Total number of packets received |
| | *PACKET_LOSS* - Metric 5 - The percentage of packets lost |
| | *LATENCY* - Metric 6 - The latency in data transfer in seconds The server responds at set intervals so after a request is sent there may be some wait time before the next interval |
| | *CONGESTION* - Metric 7 - The percentage of time spent in buffering data vs the total time for playing the streams This excludes the initial buffering time |
| | *STREAM_SETUP_TIME* - Metric 8 - The initial buffering time, before the stream actually starts playing on the client |
| TCP | *AVAILABILITY* - If a measurement could not be retrieved a 0 is set, otherwise availability is set to 1 |
| | *RESPONSE_TIME* - Total response time for the TCP service (DNS Setup Time + Connect Time) |

TABLE 3-continued

| Probe type | Metrics (in italic; Metric 1–8 are labels) and Description |
|---|---|
| | *SETUP_TIME* - Time to resolve address and establish the connection |
| | *TRANSFER_TPUT* - Transfer bytes/Transfer Time in kbytes/sec |
| | *DNS_SETUP_TIME - Metric 1* - Time to resolve hostname through DNS |
| | *CONNECT_TIME - Metric 2* - Time to perform connect to resolved IP address |
| WAP | *AVAILABILITY* - If a measurement could not be retrieved a 0 is set, otherwise availability is set to 1 |
| | *RESPONSE_TIME* - Total response time for the WAP service (DNS Setup Time + Transfer Time) |
| | *TRANSFER_TPUT* - Transfer bytes/Transfer Time in kbytes/sec |
| | *DNS_SETUP_TIME - Metric 1* - Time to resolve hostname through DNS |
| | *TRANSFER_TIME - Metric 4* - Overall time it took for the data transfer only |
| | *TRANS_BYTES - Metric 5* - The number of bytes transferred |

While this invention has been described in terms of several embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for generating alerts from a periodically sampled system, comprising:

maintaining a sampling window having a predefined number of most-recently collected samples;

calculating an alert value, said alert value representing a ratio of a first value to a total number of samples in said sampling window, said first value representing a total number of samples in said sampling window having parameters exceeding a predefined sample alert threshold; and generating a first alert if said alert value exceeds a predefined alert threshold, wherein said first alert is generated for a sampling period that results in said alert value exceeding said predefined alert threshold only if an alert is not generated in an immediately preceding sampling period.

2. The method of claim 1 wherein said first value further includes a total number of samples in said sampling window having parameters that are equal to said predefined sample alert threshold.

3. The method of claim 1 wherein said maintaining said sampling window includes adding a most-recently collected sample to said sampling window after said most-recently collected sample is obtained and removing an oldest sample from said sampling window responsive to one of said adding said most-recently collected sample and anticipating adding said most-recently collected sample.

4. The method of claim 1 further including generating a second alert if a first condition and a second condition are met, said first condition being characterized by a generation of said first alert in a first sampling period, said second condition being characterized by an alert value X calculated with a sample obtained in a second sampling period taken into account, said second sampling period being immediately succeeding said first sampling period, said alert value X being lower than said predefined alert threshold.

5. The method of claim 1 wherein said first alert reflects a most severe violation encountered among samples of said sampling window.

6. The method of claim 1 wherein said predefined sample alert threshold comprises a plurality of threshold values.

7. The method of claim 6 further including generating a second alert if a first condition and a second condition are met, said first condition being characterized by a generation of said first alert in a first sampling period, said second condition being characterized by an alert value X calculated with a sample obtained in a second sampling period taken into account, said second sampling period being immediately succeeding said first sampling period, said alert value X being higher than said predefined alert threshold and associated with a second threshold value of said plurality of threshold values, said second threshold value being different from a first threshold value of said plurality of threshold values that is associated with said first alert.

8. The method of claim 7 wherein said second alert is generated only if said second threshold value reflects a higher level of severity than a level of severity associated with said first threshold value.

9. An article of manufacture comprising a program storage medium having computer readable code embodied therein, said computer readable code being configured to generate alerts from a periodically sampled system, comprising:

computer readable code for maintaining a sampling window having a predefined number of most-recently collected samples;

computer readable code for calculating an alert value, said alert value representing a ratio of a first value to a total number of samples in said sampling window, said first value representing a total number of samples in said sampling window having parameters exceeding a predefined sample alert threshold; and computer readable code for generating a first alert if said alert value exceeds a predefined alert threshold, wherein said first alert is generated for a sampling period that results in said alert value exceeding said predefined alert threshold only if an alert is not generated in an immediately preceding sampling period.

10. The article of manufacture of claim 9 wherein said first value further includes a total number of samples in said sampling window having parameters that are equal to said predefined sample alert threshold.

11. The article of manufacture of claim 9 wherein said computer readable code for maintaining said sampling window includes computer readable code for adding a most-recently collected sample to said sampling window after said most-recently collected sample is obtained and computer readable code for removing an oldest sample from said sampling window responsive to one of said adding said most-recently collected sample and anticipating adding said most-recently collected sample.

12. The article of manufacture of claim 9 further including computer readable code for enabling generating a second alert if a first condition and a second condition are met, said first condition being characterized by a generation of said first alert in a first sampling period, said second condition being characterized by an alert value X calculated with a sample obtained in a second sampling period taken into account, said second sampling period being immediately succeeding said first sampling period, said alert value X being lower than said predefined alert threshold.

13. The article of manufacture of claim 9 wherein said first alert reflects a most severe violation encountered among samples of said sampling window.

14. The article of manufacture of claim 9 wherein said predefined sample alert threshold comprises a plurality of threshold values.

15. The article of manufacture of claim 14 further including computer readable code for enabling generating a second alert if a first condition and a second condition are met, said first condition being characterized by a generation of said first alert in a first sampling period, said second condition being characterized by an alert value X calculated with a sample obtained in a second sampling period taken into account, said second sampling period being immediately succeeding said first sampling period, said alert value X being higher than said predefined alert threshold and associated with a second threshold value of said plurality of threshold values, said second threshold value being different from a first threshold value of said plurality of threshold values that is associated with said first alert.

16. The article of manufacture of claim 15 wherein said second alert is generated only if said second threshold value reflects a higher level of severity than a level of severity associated with said first threshold value.

17. A method for fine-tuning an alert signal obtained from a periodically sampled system, comprising:

providing an alert signal generator, said alert signal generator having first logic for maintaining a sampling window at a constant window size, said sampling window containing most-recently collected samples, second logic for calculating an alert value, said alert value representing a ratio of a first value to a total number of samples in said sampling window, said first value representing a total number of samples in said sampling window having parameters exceeding a sample alert threshold, and third logic for generating a first alert if said alert value exceeds an alert threshold, wherein said first alert is generated for a sampling period that results in said alert value exceeding said alert threshold only if an alert is not generated in an immediately preceding sampling period; and providing a control panel having a plurality of user-manipulable controls, said plurality of user-manipulable controls including at least one of a first control for varying said window size, a second control for varying said sample alert threshold, and a third control for varying said alert threshold.

18. The method of claim 17 wherein said first alert reflects a most severe violation encountered among samples of said sampling window.

19. The method of claim 17 wherein said periodically sampled system represents an internet service monitoring system.

* * * * *